US009846427B2

(12) United States Patent
Straub et al.

(10) Patent No.: US 9,846,427 B2
(45) Date of Patent: Dec. 19, 2017

(54) CHARACTERIZING 3-D PRINTED OBJECTS FOR 3-D PRINTING

(71) Applicant: University of North Dakota, Grand Forks, ND (US)

(72) Inventors: Jeremy Straub, Grand Forks, ND (US); Benjamin Kading, Park Rapids, MN (US); Scott Kerlin, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 0 days.

(21) Appl. No.: 15/003,619

(22) Filed: Jan. 21, 2016

(65) Prior Publication Data

US 2016/0210737 A1    Jul. 21, 2016

Related U.S. Application Data

(60) Provisional application No. 62/111,196, filed on Feb. 3, 2015, provisional application No. 62/106,155, filed on Jan. 21, 2015.

(51) Int. Cl.
*G06K 9/00* (2006.01)
*G05B 19/4099* (2006.01)
(Continued)

(52) U.S. Cl.
CPC .......... *G05B 19/4099* (2013.01); *G06T 7/001* (2013.01); *G06T 7/194* (2017.01);
(Continued)

(58) Field of Classification Search
None
See application file for complete search history.

(56) References Cited

U.S. PATENT DOCUMENTS 8,412,588 B1* 4/2013 Bodell .................. G06Q 10/06
700/119
2006/0111807 A1   5/2006 Gothait et al.
(Continued)

OTHER PUBLICATIONS

"International Application No. PCT/US2016/014382, International Search Report dated Jun. 9, 2016", 4 pgs.
(Continued)

*Primary Examiner* — Weiwen Yang
(74) *Attorney, Agent, or Firm* — Schwegman Lundberg & Woessner, P.A.

(57) ABSTRACT

The systems and methods described herein include an approach to performing quality assessment for 3-D printed objects during the printing process, for collecting data regarding 3-D printed objects, and for capturing data to make a digital model of an object. This approach uses sensor data (e.g., digital imagery) to characterize printing progress or to detect 3-D printing defects that would otherwise result in printing incomplete objects, such as premature printing job termination, dry printing, over/under application, movement of the filament, and other defects. Sensor data capturing can also be used as part of a destructive scanning process to perform post-printing object assessment or to collect data on a real-world object to facilitate creation of a digital model. These systems and methods may leverage the discrete nature of a pixel provided through digital imagery to be assessed with limited computational resources in a non-recursive manner.

14 Claims, 7 Drawing Sheets

(51) Int. Cl.
 *G06T 7/00* (2017.01)
 *G06T 7/194* (2017.01)
(52) U.S. Cl.
 CPC .............. *G05B 2219/49005* (2013.01); *G05B 2219/49023* (2013.01); *G06T 2207/30144* (2013.01)

(56) References Cited

U.S. PATENT DOCUMENTS

| | | |
|---|---|---|
| 2007/0047768 A1 | 3/2007 | Gordon et al. |
| 2009/0232412 A1 | 9/2009 | Hutchinson et al. |
| 2011/0028825 A1 | 2/2011 | Douglas et al. |
| 2014/0039662 A1 | 2/2014 | Boyer er al. |
| 2015/0177158 A1* | 6/2015 | Cheverton ......... G01N 21/8851 700/119 |
| 2015/0197063 A1* | 7/2015 | Shinar ..................... G06F 17/50 700/98 |
| 2016/0071318 A1* | 3/2016 | Lee .......................... G06T 17/00 345/419 |
| 2016/0098825 A1* | 4/2016 | Dave ....................... G06T 7/001 419/53 |

OTHER PUBLICATIONS

"International Application Serial No. PCT/US2016/014382, Invitation to Pay Add'l Fees and Partial Search Rpt dated Mar. 22, 2016 ", 2 pgs.

"International Application Serial No. PCT/US2016/014382, Written Opinion dated Jun. 9, 2016", 5 pgs.

\* cited by examiner

200

400

500

CHARACTERIZING 3-D PRINTED OBJECTS FOR 3-D PRINTING

PRIORITY

This application claims the benefit of U.S. Provisional Application Ser. No. 62/111,196, filed Feb. 3, 2015, and also claims the benefit of U.S. Provisional Application Ser. No. 62/106,155, filed Jan. 21, 2015, which applications are incorporated herein by reference in their entireties.

BACKGROUND

Existing additive manufacturing solutions (e.g., 3-D printing solutions) may have the potential to disrupt manufacturing in the way that online music and electronic books disrupted their respective industries. 3-D printing may be used for rapid prototyping or point-of-sale printing, and may be used for short production runs or bespoke items, such as custom equipment parts, artificial limbs, dental fixtures, and bridge components, or other devices.

Some 3-D printing solutions date back to the 1970s. Early 3-D printing applied a technique known as fused deposition modelling (FDM), which fuses layer of extruded material upon layer of extruded material to create an object. Later 3-D printing solutions included laser-sintering and power-based approaches. Printed 3-D materials may include masonry, plastics, metals, biodegradable materials, imaging apertures, pharmaceuticals, nanocomposites, microfluids, and other devices. The technology has also been used for preserving and increasing access to historical objects via replication, and has been useful in creating educational excitement.

Several impediments exist that limit the adoption of 3-D printing. One relevant concern is that existing 3-D printers cannot detect product defects, especially defects that render the product unsuitable for the production of safety-critical or performance-critical parts. For such safety-critical items, production costs and delivery times may be affected significantly, to such an extent that the production of bespoke parts may not be feasible.

An existing technology that may be applied to assess 3-D printing is 3-D scanning. 3-D scanning has been used to measure feet to create custom running shoes, evaluate the effect of cosmetic products, uniform sizes, and custom swimwear, for example. 3-D scanning has also been used to detect a variety of changes and defects including changes in skeletal structure, to validate quality of automotive products, or to assess concrete or turbine blades. 3-D scanning solutions may be performed using laser and "white light" techniques. Low-cost solutions have been created, such as using the Xbox Kinect or Raspberry Pi cameras. Some 3-D scanning solutions require scanner movement around an object, whereas others allow the object to remain stationary. In some cases, a portion of an object is removed to allow scanning of the interior structure. This removal of part of the object is known as destructive scanning. In an embodiment, destructive scanning may include removing layers from an object or slicing the object into layers, and re-scanning the object during or following removal of each layer.

Some existing manufacturing solutions use large-run or statistically-driven quality management to monitor manufactured items. This does not properly handle the generation of low-run, customized, and bespoke 3-D printable items. This is problematic, as some quality management systems, such as total quality management (TQM), are highly reliant on being able to characterize and guarantee the quality of their parts. This characterization and guarantee can be performed via inspection, such as by the supplier prior to shipping, or by the buyer upon receipt. As an alternative to inspection, process certification is often preferred, as it may reduce cost levels, such as by removing or reducing inspection time costs, and catching defects earlier in process. However, many quality management systems are directed to post-manufacturing analysis and corrective actions.

When quality is critical, it may be possible to test 3-D printed objects in post-production. However, post-production testing may limit the type of objects that can be produced, as some tests may be destructive. Additionally, given the potential for irregularities in any item, testing a small number of units may not be suitable to certify a batch.

Existing additive manufacturing systems (e.g., 3-D printing systems) lack the capability to assess the quality of the products that they produce. Desktop 3-D printers, for example, may continue printing until they have completed all steps in an object, even though their filament ran out or jammed part way through. These and other manufacturing systems may fail to notice minor defects that could potentially be corrected automatically. For example, in multi-layered 3-D printing, a defect is most easily corrected before a subsequent layer is printed on the defective layer. Existing systems also do not include functionality to identify defects that require manual intervention. For example, a defect may render the object unsuitable for use, and without user intervention, the defect may render any additional time or supplies consumed on the current print wasteful.

DETAILED DESCRIPTION

Figure 1A:
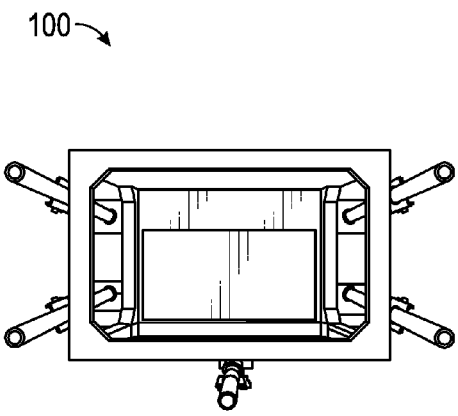
FIGS. 1A-1D illustrate a sensor configuration, in accordance with some embodiments.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

The systems and methods described herein include an approach to performing quality assessment for 3-D printed objects during and after the printing process. This approach uses sensor data (e.g., digital imagery) to assess the progress and quality of objects being printed by a 3-D printing process. In particular, sensor data capturing and processing may be used to detect various types of 3-D printing defects that could result in printing incomplete or otherwise unsuitable objects. Various 3-D printing defects may include premature printing job termination or dry printing (i.e., where printing filament is not dispersed), and may result in an incomplete object or no printed object. Other 3-D printing defects may include over/under application, movement of the filament, movement of the object, application of the filament to undesired areas, holes, and other defects.

A similar sensing system can be used for other applications, such as the characterization of a completed 3-D printed object or the characterization of any object to facilitate its later 3-D printing. Either application includes at least some of the following steps: First, a complete object is initially scanned to constrain the exterior bounds of the object. Second, a scan is performed to identify and allow the exclusion of non-object background. Third, the scan is deconstructed on a layer-by-layer basis, where the layers of deconstruction may correlate to layers of previous or subsequent 3-D printing. Fourth, a layer of the object is removed, and one or more additional scans are performed after or during the removal of each layer. These layer-specific scans are used to characterize the object and its exposed interior. Finally, a digital model is created from these scans using a computer algorithm.

As described herein, the assessment used in these systems and methods may leverage the discrete nature of a pixel provided through digital imagery to be performed with limited computational resources in a non-recursive manner that has a linear time-cost relationship to the number of pixels to be assessed. Pixel-based data may also be vectorised or otherwise converted into other formats for various types of assessment. This assessment may enable easy implementation of these systems and methods in various 3-D printing control systems. Though systems and methods are discussed herein using pixel information obtained using a visible light camera, pixel information may be provided by an image generated using invisible light (e.g., infrared light), by an image using acoustic frequencies (e.g., ultrasound), or by any other sensor with active or passive sensing that provides (or can be converted to provide) pixel sensor data. The sensor data may be generated using non-penetrating visible light to identify the exterior of the printed surface, the sensor data may include a combination of light and sensing technology (e.g., radiation) that is minimally penetrating to examine an interior of a printed device, or any combination of penetrating and non-penetrating light or sensing technology.

Additional systems and methods may be used to enhance 3-D defect assessment. For example, commercial systems that construct CAD models from a collection of imagery may create point-clouds, where the point-clouds may be used to exclude points outside of an area-of-interest. Other system may use vector-based models and comparisons, ray-tracing, or other methods of comparing a model against a partially or fully completed printed device. This may allow characterization of additional types of defects, and may address environmental change issues. Additional systems and methods may identify and characterize other types of defects, particularly including defects where material is present but may have a structural fault. Some systems and methods may not require sensor data for a final object as a baseline for comparison purposes.

In addition to identification of manufacturing defects, the systems and methods described herein may provide analysis of the defect and execute or recommend corrective actions. For example, a printer-induced defect may be fixed by the printer itself, such as identification of an excess or lack of filament in a location. Depending on the severity of the defect, an operator may be provided with a recommendation to correct the defect manually or to restart the entire printing process. A mill device or other removal methodology may be used to remove unwanted or excess filament.

The systems and methods described herein enable the general characterization of 3-D parts and the assurance of their suitability for incorporation in other products and goods. These systems and methods may be especially useful in in bespoke industrial manufacturing, such as single-item or small-batch made-to-order items. For example, if only a single instance of an item is being printed, the item could not be compared to a different copy of that item. One application of this could include time-sensitive or point-of-sale printings. In the point-of-sale example, a shopper could enter a store, select an item to be printed, and the item could be printed while the shopper continues to shop within the store. In this example, the item must be printed as quickly and reliably as possible to reduce the inconvenience to the shopper. Other time-sensitive printings may include automotive, electrical, or other components that are printed at a service shop on an as-needed basis while customers wait. Allowing at or near point-of-sale printing (which is made possible via defect detection) provides this benefit. Further, defect detection may reduce the need for inventory or for post-manufacturing testing of printed objects. Some medical devices or bio-compatible devices (e.g., orthodontics) may need to be printed with high reliability and within a short timeframe. For manufacturing of medical or other safety-critical items, detection of defects during printing could significantly improve safety and reduce liability. Defect detection may be useful for quality assurance of inbound parts and for regulatory compliance assessment purposes.

Figure 1B:
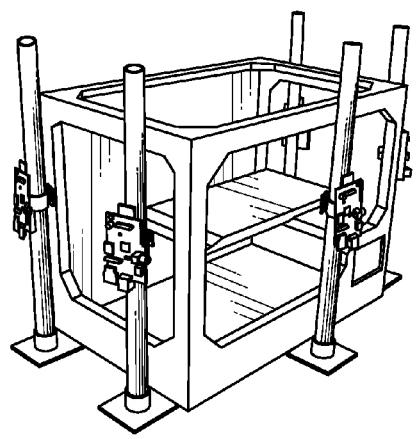
Figure 1C:
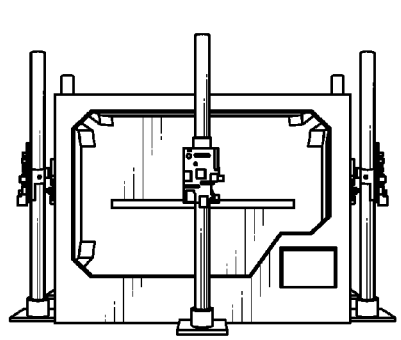
Figure 1D:
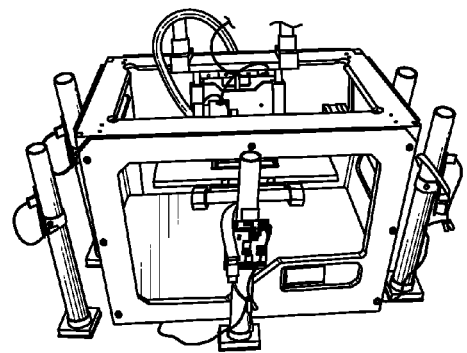

FIGS. 1A-1D illustrate a sensor configuration, in accordance with some embodiments. FIG. 1A depicts a top view of a computer-aided design (CAD) of a sensor configuration, FIG. 1B depicts a perspective view of the CAD design, FIG. 1C depicts a front view of the CAD design, and FIG. 1D depicts a picture of a physical implementation of a sensor configuration. This sensor configuration may include image capture devices or other sensors that can be used to detect presence or absence of a material. In an example, image capture devices may be used to capture and analyze images for identification and characterization of differences in 3-D printed objects. In an embodiment, a sensor array may be used in connection with a 3-D printer. In an embodiment, a sensor array may include one or more image capture devices, such as Raspberry Pi units with camera devices. The units may be networked using Ethernet cable and a switch to a central server, where the central server may be used to trigger imaging. The optical sensors may be arranged so the images can be used to produce one or more 3-D images of the product being printed. For example, the optical sensors may be arranged in a specific physical configuration to provide views from different positions, where images captured from the different positions can be used to produce separate 3-D images of the product during or after 3-D printing. In an embodiment, a single fixed sensor may be used to characterize printing completeness and detect faults that have resulted in filament not being dispensed.

As shown in FIGS. 1A-1D, the sensors may be arranged around a 3-D printer. The sensors may be attached to stands, such as stands comprised of a 3-D printed base and a PVC pipe. The stands may be affixed to a table, such as using double-sided tape. The stands may be mobile, such as riding on a passive or active track, or manually positioned. The stands may be built into or attached to the 3-D printer. The sensors may also be used without stands, such as when the sensors are integrated into the 3-D printer chassis. An algorithm for determining the alignment of sensors may be maintained and updated according to the presence and type of stands. An Ethernet cable and power cable may be connected to each camera. The power cables may be connected to a variable DC power supply, such as is shown on the far left of FIG. 1D. The Ethernet cables may be connected to a server via a network switch or hub, allowing imaging to be triggered from a remote device, such as the server's console. The sensor position, motion, or image capture triggers may be controlled by software or hardware. The sensor control software or hardware may be contained within the 3-D printer chassis.

To facilitate comparison, the images may be taken at a single 3-D printer configuration. This may reduce the level of irrelevant data in the image from non-printed-object changes. In some examples, data may be collected during the continuous operation of the 3-D printer or object destruction as part of 3-D printing or destructive scanning, without stopping the printing process. In other examples, data may be collected by stopping the printing process at numerous points and placing the printer in sleep mode, where printer sleep mode may operate to move the printing plate to a common position. As a result, an image expected to serve as the final in-process image (in which the structure is done or very nearly done) may be used as the ideal object for comparison purposes. The image of the ideal object may be generated from a CAD model.

FIGS. 2A-2F illustrate sensor output values of various threshold levels, in accordance with some embodiments. Groups of sensor output values may be generated using various levels, such as using a particular threshold in image processing. As discussed above, data analysis may involve a comparison of the in-process object to a final version of the object or a model thereof. In addition to the application of characterizing build progress, this comparison may be used to detect and identify at least two types of potential error, including when a build has been stopped mid-progress resulting in an incomplete object, and including when an issue with the printer results in a failure to dispense or deposit filament.

Figure 2A:
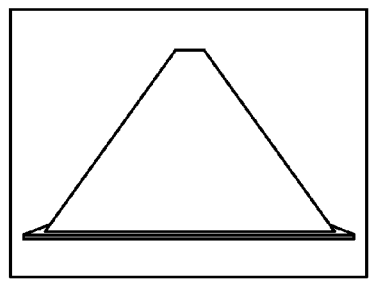
FIGS. 2A-2F illustrate sensor output values of various threshold levels and associated post algorithmic processing, in accordance with some embodiments.
Figure 2B:
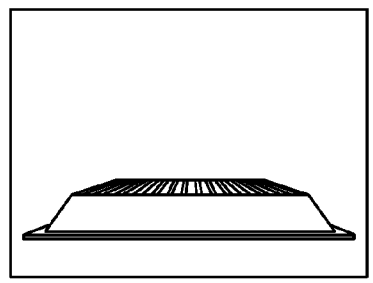
Figure 2C:
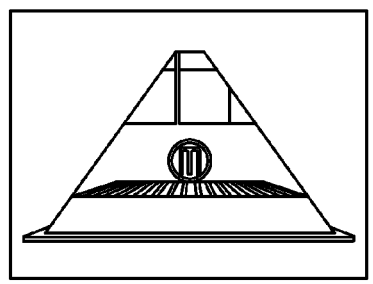

A comparison of FIGS. 2A-2F illustrates one such system and method. FIG. 2A shows an image captured by the front camera position that was used as the complete object. FIG. 2B shows partial object from the first progress step. FIG. 2C shows a difference between a partial and a complete object.

Figure 2D:
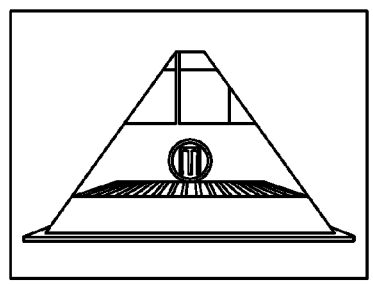
Figure 2E:
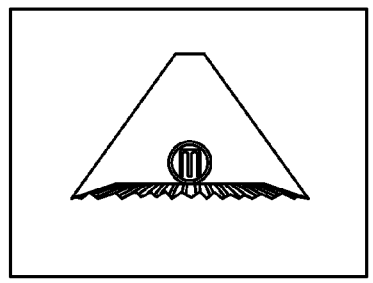
Figure 2F:
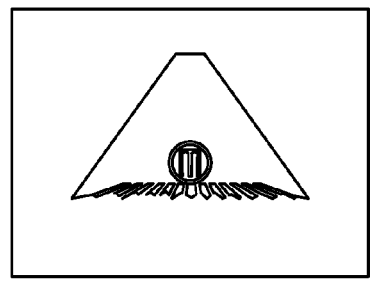

FIG. 2C characterizes the level of difference in the image: brighter areas represent the greatest levels of difference, which in turn is used to generate the threshold-based comparisons in FIGS. 2D-2F. FIG. 2C is a line drawing representing an image created by placing, for each pixel, a brightness value (the same red, green and blue values), where the brightness value corresponds to a scaled level of difference. In an embodiment, the scale factor may be calculated via:

$$ScaleFactor = \frac{255}{MaxDifference} \quad (1)$$

In the equation above, MaxDifference is the maximum level of the summed difference of the red, green, and blue values for any single pixel anywhere in the image. Using this, the brightness value may be computed using:

$$Brightness_{i,j} = Difference_{i,j} \times ScaleFactor \quad (2)$$

The three FIGS. 2D-2F are line drawings representing images that show comparisons between final and in-progress images on a pixel-by-pixel basis at three different thresholds. In particular, FIG. 2D was generated using a threshold of 50, FIG. 2E was generated using a a threshold of 75, and FIG. 2F was generated using a a threshold of 100. The result of this comparison is the identification of differences between the two images.

Based on the use of thresholds, not all difference levels are salient. Areas outside of the pyramid area may appear completely black (as they would be if there was absolutely no difference), but should not be considered. Thus, a threshold may be used to determine salient levels of difference from presumably immaterial levels. Pixels exceeding this difference threshold are evaluated, and those failing to exceed this value are ignored. Considering the significance of this value threshold value, several prospective threshold values are shown. In particular, FIGS. 2D-2F are line drawings representing images that show the pixels included at threshold levels of 50, 75 and 100. In these line drawings, black areas within the original images were considered significant areas and white areas were removed.

In an example, a threshold level of 50 may incorrectly select the base of the object (which is the same as the final object) as different. A 75 threshold level may correctly Characterizes a base as the same, and may detect a slight pulling away of the object from the build plate. A 75 threshold level may also (incorrectly) identify a small area in the middle of the in-progress object and (correctly) the visible lattice from construction. A demarcation between the remainder of the object that has not yet printed and the already printed area is also clear. The 100 threshold may (incorrectly) ignore a small bottom area of this region. In some examples, a "circle-M" logo may not be identified as different, based on the closeness of its red color to an orange filament.

Figure 3:
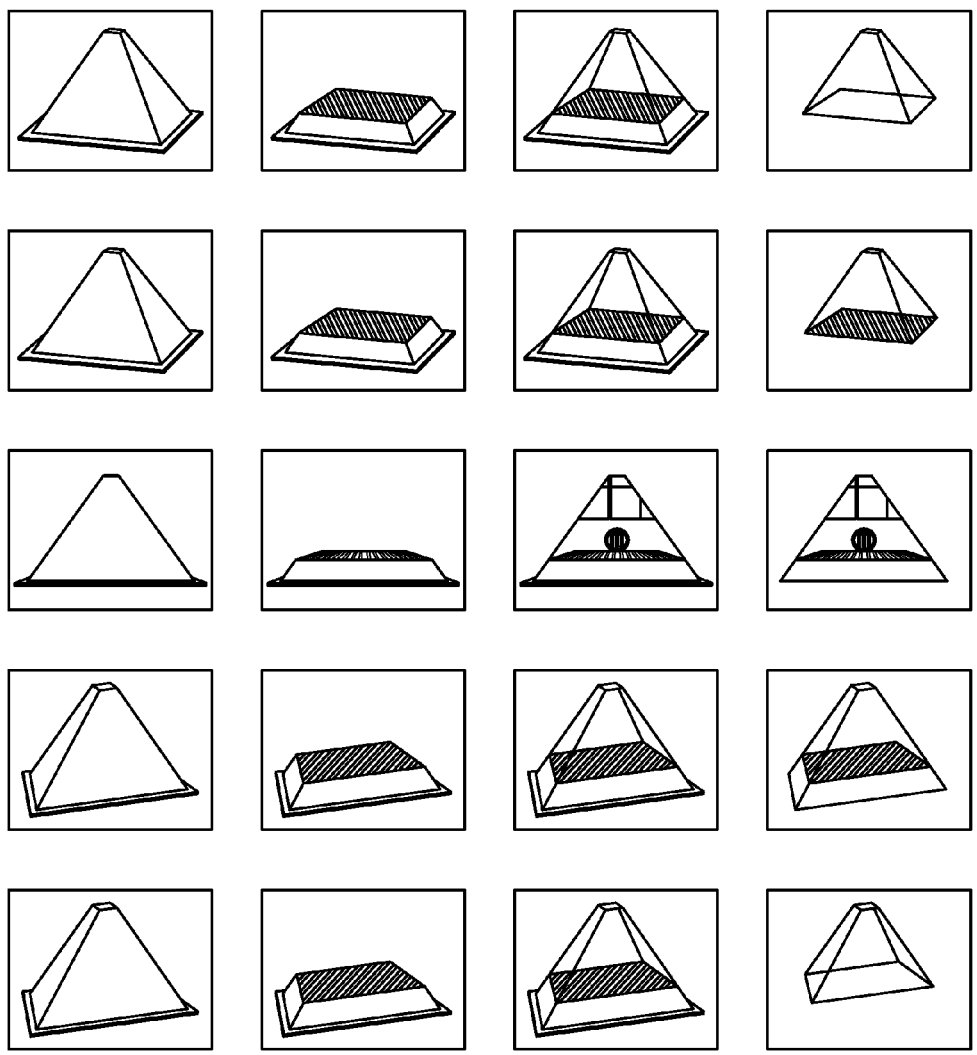
FIG. 3 illustrates output values using various sensor angles, in accordance with some embodiments.

FIG. 3 illustrates sensor and algorithm output values using various sensor angles, in accordance with some embodiments. The line drawings in FIG. 3 are based on images that were captured using cameras positioned at various angles relative to the printer, and were processed at a 75 threshold level. The first column in FIG. 3 was based on the finished object image, and the second column was based on the partial (e.g., stage 1) object. The third and fourth columns depict the partial-complete difference comparison and threshold-exceeding pixels identification.

Based on threshold level selection, a 75 difference threshold level may be selected for assessment. This 75 difference threshold level was applied to all of the images from all five cameras and eight progress levels. In FIG. 3, the processing of the progress level 1 image for all five camera positions is shown. The leftmost column shows the finished object. The second column shows the current progress of printing of this object. The third and fourth columns characterize the areas of greatest difference (brightest white) from areas of less significant (darker) difference and the identification of pixels exceeding the difference threshold, respectively.

Figure 4A:
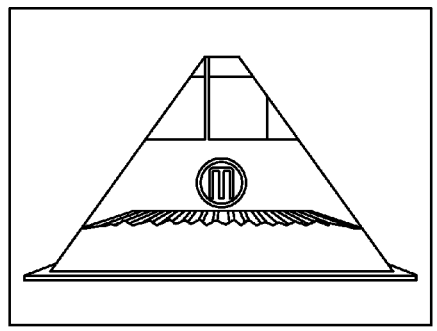
FIGS. 4A-4F illustrate output values generated via various color exclusions, in accordance with some embodiments.
Figure 4B:
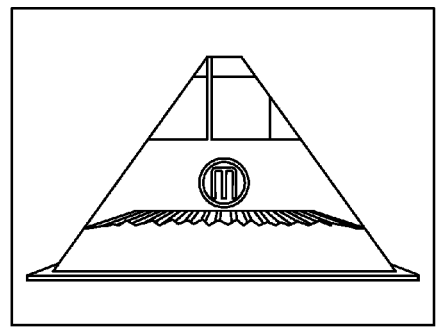
Figure 4C:
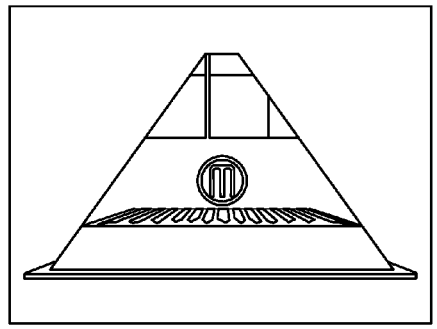
Figure 4D:
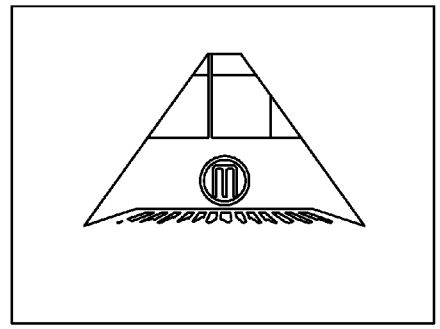
Figure 4E:
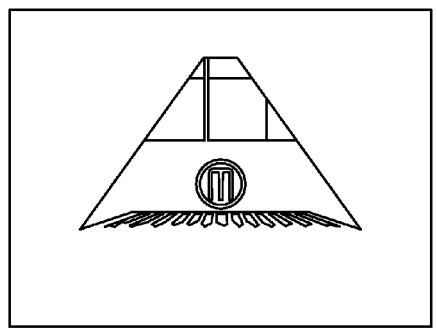
Figure 4F:
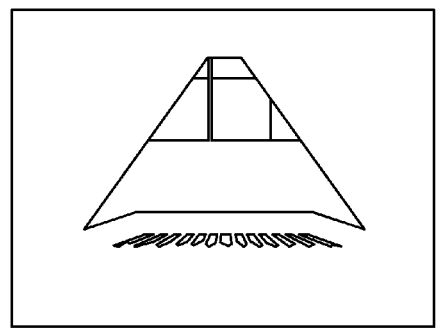

FIGS. 4A-4F illustrate sensor and algorithm output values generated via various color exclusions, in accordance with some embodiments. FIGS. 4A-4F are line drawings representing the effect of excluding the consideration of certain colors, such as excluding blue, green and red channels. FIG. 4A shows the exclusion of blue, and FIG. 4B shows the exclusion of green. FIGS. 4A-4C depict the partial-complete object difference. Similarly, FIGS. 4D-4F depict the threshold-exceeding areas using a 75 threshold level. Neither exclusion corrects the erroneously detected circle-M logo though the blue exclusion creates greater difference levels around two indentations to either side of it. Excluding red has a significant effect on the circle-M logo, however it places many different pixels below the significant pixel detection threshold.

Figure 5A:
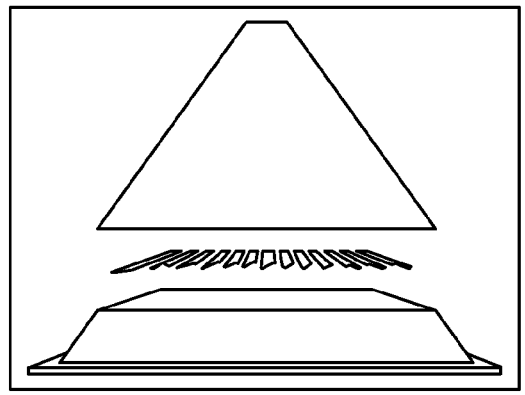
FIGS. 5A-5C illustrate output values generated via red exclusion, in accordance with some embodiments.
Figure 5B:
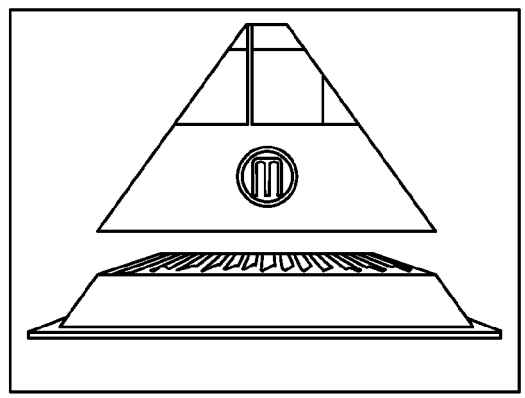
Figure 5C:
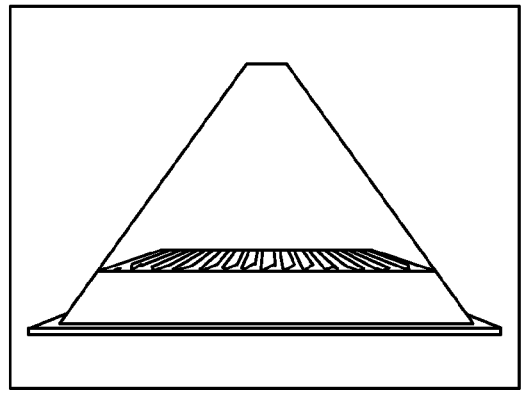

FIGS. 5A-5C illustrate sensor and algorithm output values generated via red exclusion, in accordance with some embodiments. Because the total difference may be a summed and not an averaged value, the threshold may be adjusted when part of the difference level is excluded. FIGS. 5A-5C are line drawings representing the effect of manipulating the threshold value. FIG. 5A shows a threshold value of 75, while FIGS. 5B-5C show the effect of threshold values of 62 and 50, respectively.

Given that the erroneous circle-M logo detection could be easily corrected via applying tape or paint over the logo, this was not considered further. However, it has been included in the discussion to demonstrate the efficacy of the technique for dealing with erroneously classified pixels. Additional manipulation of the threshold level (as well as a more specific color exclusion/inclusion approach could potentially be useful in many applications.

Work now turned to detecting the level of completeness of the object (also relevant to assessing build progress). To this end, data from all eight progress levels was compared to the final image. The difference was depicted visually as well as assessed quantitatively.

Figure 6:
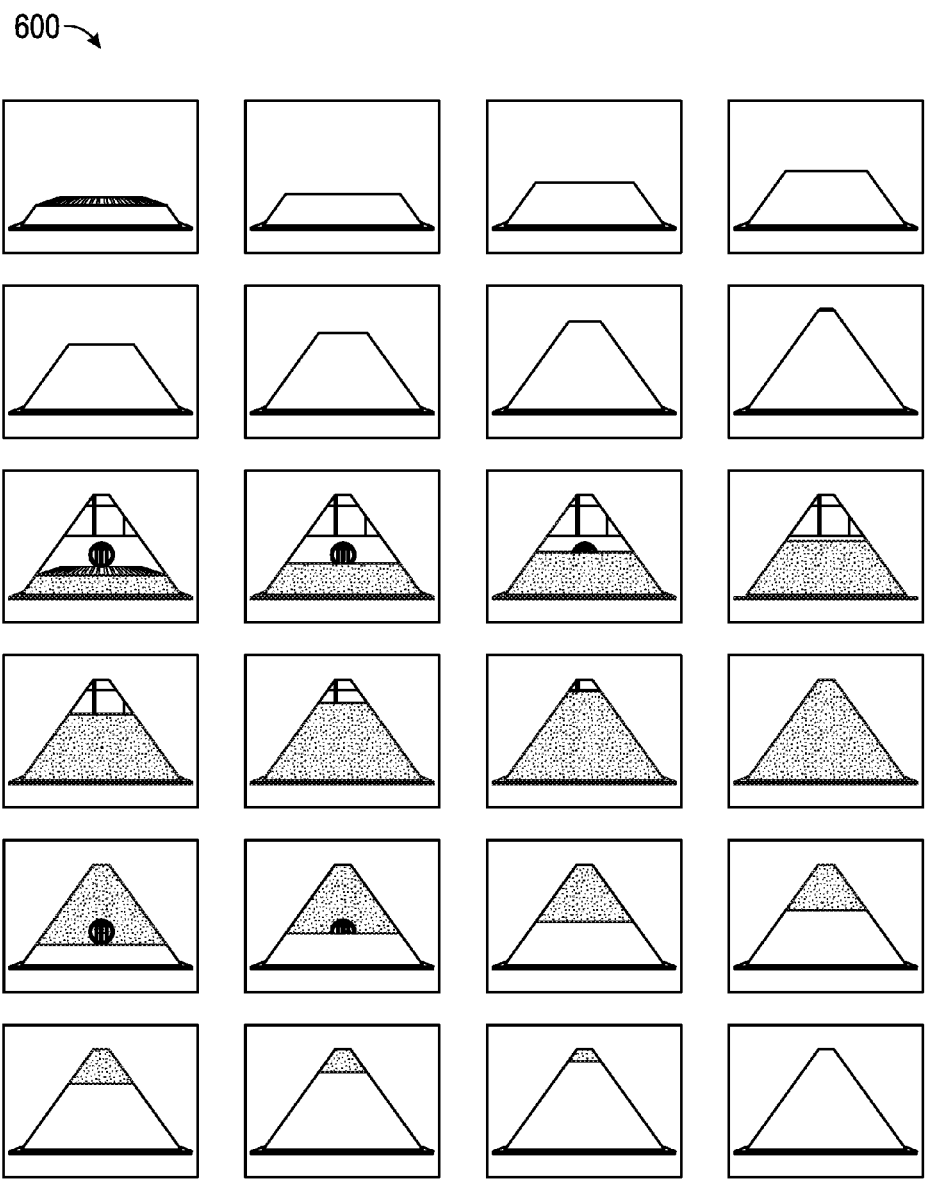
FIG. 6 illustrates output values at various printing stages, in accordance with some embodiments.

FIG. 6 illustrates sensor and algorithm output values at various printing stages, in accordance with some embodiments. The images in FIG. 6 are line drawings present all eight progress levels for the front view. The top row shows line drawings representing the captured image. The second row displays the characterization of the difference level. The bottom row shows line drawings representing the pixels that are judged, via the use of the threshold, to be significantly different.

The build progress (e.g., object completeness) is visible in the progression of the images in FIG. 6. FIG. 6 also shows that some minor background movement, or movement relative to the background, may have occurred between progress points two and three. Such background movement may result in the elimination of the limited points detected in the background in the first two images.

In addition to the qualitative analysis of comparing the preceding figures, sensor data may be processed to provide a quantitative analysis. In an embodiment, an example of quantitative data that could be collected from this collection process is presented in Table 1, which shows the aggregate level of difference by progress level and camera position. The embodiment shown in Table 1 shows a progression of declining difference can also be seen in this numeric data. Table 2 presents a maximum difference based on the embodiment data shown in Table 1. While there is decline in maximum difference as the progress levels advance, the correlation is not absolute, as there are instances where the difference increases from a progress level to the next subsequent one.

TABLE 1

Aggregate difference by level of progress and angle.

| | | Angle | | | | |
|---|---|---|---|---|---|---|
| | | 1 | 2 | 3 | 4 | 5 |
| Progress | 1 | 201575263 | 154742364 | 606260772 | 211214209 | 386909779 |
| | 2 | 159074877 | 120966265 | 529193273 | 180098380 | 338718052 |
| | 3 | 128796927 | 100588139 | 284574631 | 135275350 | 300301392 |
| | 4 | 95224509 | 78451958 | 213765197 | 96921027 | 310651833 |
| | 5 | 83581787 | 59900209 | 196817866 | 89931596 | 302212892 |
| | 6 | 72126962 | 58127383 | 169154720 | 77356784 | 303391576 |
| | 7 | 43090774 | 47638489 | 48088649 | 49056229 | 289977798 |

TABLE 2

Maximum difference level by level of progress and angle.

| | | Angle | | | | |
|---|---|---|---|---|---|---|
| | | 1 | 2 | 3 | 4 | 5 |
| Progress | 1 | 633 | 568 | 542 | 604 | 669 |
| | 2 | 631 | 477 | 539 | 665 | 663 |
| | 3 | 613 | 489 | 584 | 661 | 648 |
| | 4 | 583 | 476 | 568 | 656 | 624 |
| | 5 | 562 | 485 | 559 | 658 | 625 |
| | 6 | 555 | 473 | 561 | 667 | 606 |
| | 7 | 502 | 435 | 446 | 609 | 564 |

Additional analysis of the example embodiment data is presented in Tables 3 and 4, which presents the average level of difference for each, progress level and angle and the percentage of difference relative to total difference, respectively. The aggregate difference (Table 1) and average difference (Table 3) for angle 3 are higher for most levels because the object fills significantly more of the image area from this angle. Looking at the difference from a percentage perspective (in Table 4) demonstrates that the object completion values (ignoring the amount of image space covered) are much closer to the other angles.

TABLE 3

Average level of difference per-pixel by level of progress and angle.

| | | Angle | | | | |
|---|---|---|---|---|---|---|
| | | 1 | 2 | 3 | 4 | 5 |
| Progress | 1 | 40.00 | 30.71 | 120.32 | 41.92 | 76.79 |
| | 2 | 31.57 | 24.01 | 105.02 | 35.74 | 67.22 |
| | 3 | 25.56 | 19.96 | 56.48 | 26.85 | 59.60 |
| | 4 | 18.90 | 15.57 | 42.42 | 19.23 | 61.65 |
| | 5 | 16.59 | 11.89 | 39.06 | 17.85 | 59.98 |
| | 6 | 14.31 | 11.54 | 33.57 | 15.35 | 60.21 |
| | 7 | 8.55 | 9.45 | 9.54 | 9.74 | 57.55 |

TABLE 4

Percentage of difference by level of progress and angle.

| | | Angle | | | | |
|---|---|---|---|---|---|---|
| | | 1 | 2 | 3 | 4 | 5 |
| Progress | 1 | 25.7% | 24.9% | 29.6% | 25.1% | 17.3% |
| | 2 | 20.3% | 19.5% | 25.8% | 21.4% | 15.2% |
| | 3 | 16.4% | 16.2% | 13.9% | 16.1% | 13.5% |
| | 4 | 12.2% | 12.6% | 10.4% | 11.5% | 13.9% |
| | 5 | 10.7% | 9.7% | 9.6% | 10.7% | 13.5% |
| | 6 | 9.2% | 9.4% | 8.3% | 9.2% | 13.6% |
| | 7 | 5.5% | 7.7% | 2.3% | 5.8% | 13.0% |

The aggregate difference level and derivative metrics provide one way to assess the completion. However, this is affected by lots of small ambient differences and by the level of difference between the final object and the background, which could be inconsistent across various areas of the object. Another method may use the threshold value to count the number of pixels that have been judged to be significantly different. Particularly for cases where lighting changes occur or foreground-background differences are inconsistent, this reduces the effect of non-object differences. Example embodiment data for the number of pixels that are different is presented in Table 5.

TABLE 5

Number of pixels with above-threshold difference, by progress level and angle.

| | | Angle | | | | |
|---|---|---|---|---|---|---|
| | | 1 | 2 | 3 | 4 | 5 |
| Progress | 1 | 328775 | 258901 | 1353743 | 352334 | 503292 |
| | 2 | 238267 | 204661 | 755034 | 261407 | 191781 |
| | 3 | 166407 | 163139 | 545944 | 190409 | 161034 |
| | 4 | 108800 | 100143 | 321195 | 117178 | 105233 |
| | 5 | 94427 | 83715 | 261903 | 96687 | 75725 |
| | 6 | 68056 | 63622 | 189724 | 70255 | 59148 |
| | 7 | 15088 | 14094 | 39813 | 18292 | 16624 |

This method may be affected by slight movements. In particular, a slight movement of a door that falls within the viewing area of angle five occurred between progress points one and two, creating a significantly higher number of difference points in angle five, progress point one. This is a far more pronounced effect than this had on the aggregate difference approach shown in Table 1. A method could exclude this type of movement through multiple techniques including greater color filtering or enclosing the printer in an opaque box or wrap.

TABLE 6

Percent of pixels with above-threshold difference, by progress level and angle.

| | | Angle | | | | |
|---|---|---|---|---|---|---|
| | | 1 | 2 | 3 | 4 | 5 |
| Progress | 1 | 6.52% | 5.14% | 26.87% | 6.99% | 9.99% |
| | 2 | 4.73% | 4.06% | 14.98% | 5.19% | 3.81% |
| | 3 | 3.30% | 3.24% | 10.83% | 3.78% | 3.20% |
| | 4 | 2.16% | 1.99% | 6.37% | 2.33% | 2.09% |
| | 5 | 1.87% | 1.66% | 5.20% | 1.92% | 1.50% |
| | 6 | 1.35% | 1.26% | 3.77% | 1.39% | 1.17% |
| | 7 | 0.30% | 0.28% | 0.79% | 0.36% | 0.33% |

TABLE 7

Percentage of difference at each level of progress and angle.

| | | Angle | | | | |
|---|---|---|---|---|---|---|
| | | 1 | 2 | 3 | 4 | 5 |
| Progress | 1 | 32.2% | 29.1% | 39.0% | 31.8% | 45.2% |
| | 2 | 23.4% | 23.0% | 21.8% | 23.6% | 17.2% |
| | 3 | 16.3% | 18.4% | 15.7% | 17.2% | 14.5% |
| | 4 | 10.7% | 11.3% | 9.3% | 10.6% | 9.5% |
| | 5 | 9.3% | 9.4% | 7.6% | 8.7% | 6.8% |
| | 6 | 6.7% | 7.2% | 5.5% | 6.3% | 5.3% |
| | 7 | 1.5% | 1.6% | 1.1% | 1.7% | 1.5% |

In addition to looking at the raw number of pixels exhibiting difference, this can also be assessed as a percentage of pixels exhibiting a difference in the example embodiment image (Table 6) or, more usefully, as the percentage of total difference level in the example embodiment (Table 7). These values, again, show a consistent decline in difference from progress level to subsequent progress level.

Data collected using this system and method show a positive correlation between object completeness and difference level. This is present in both the aggregate difference and number-of-different pixels (based on threshold application) data. The former is influenced by potentially irrelevant difference-magnitude information. For this application, this data was not important; however, for other applications, the color difference could be indicative of the magnitude of defect. For example, for an object with different interior coloration (or subsurface layer coloration), a surface scratch might generate a low magnitude difference, while more significant (that breaks through the outer layer) would have greater difference magnitude.

The later metric corresponds (as depicted aptly in the figures) to the surface area of the object. For defect detection or completeness/incompleteness assessment, this may be sufficient; however, for applications characterizing the amount of time taken versus progress (or projecting remaining time, etc.) a metric tied to volume may be more relevant. Notably, however, the fact that many 3-D printing system use a very limited lattice fill, may make surface area (which may represent the bulk of a layer's printing) a more relevant metric (that could be augmented with a fill level projection based on a percentage of the surface area).

The example data collected has also shown that this type of system can be very sensitive to environmental or camera position changes. The very small movement present in some of the early angle three images as well as the effect of the door position on the first angle 5 image demonstrate the importance of either avoiding the sensing of the surrounding environment or excluding it from consideration. An algorithm may be used to identify and exclude background areas and changes.

The systems and methods used to characterize the object during its layer-by-layer production can be used for object characterization during a destructive scan. The destructive characterization may be used for various purposes, including assessment, model production, or other purposes. A multi-sensor system provides the benefit of being able to scan on a layer-by-layer basis or during the deconstruction process. For example, the multi-sensor system does not require the destruction process to be stopped after each layer is removed to perform a scan, and can instead scan throughout the deconstruction process. A multi-sensor system also provides the additional benefit of depth perception. Depth perception may reduce or eliminate the need to pre-treat an object, such as pre-treating an object to separate identification of the current layer from other parts. A multi-sensor system also facilitates identification of various materials within the object being characterized. For example, an object may have been 3-D printed or assembled using various dissimilar materials, or an object may have been generated through multiple printings by aggregating multiple layers of a single material type. In addition to using a multi-sensor system to identify of various materials, a combination of multiple scanning techniques may be used.

Figure 7:
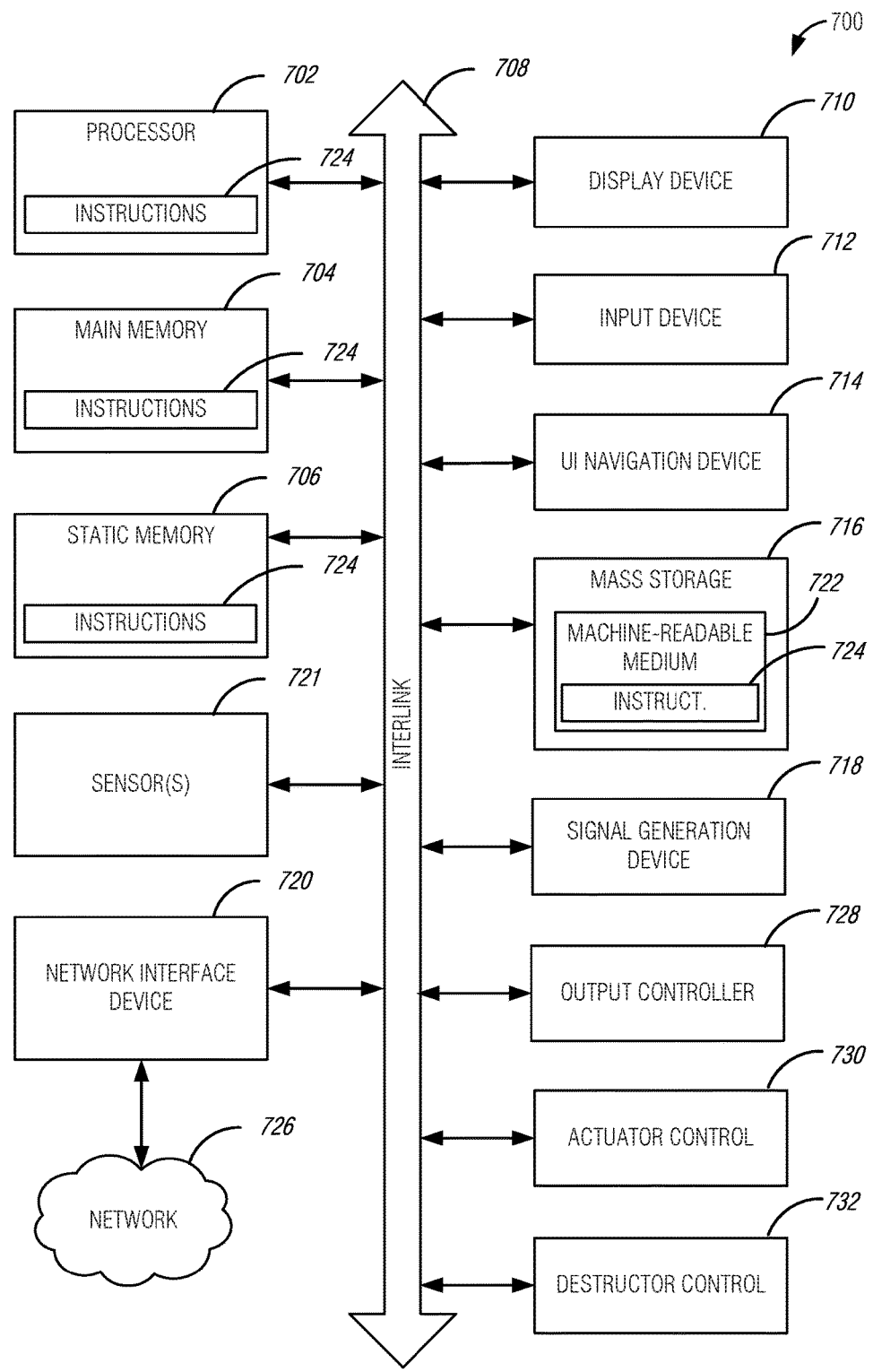
FIG. 7 is a block diagram illustrating an example of a machine, upon which one or more embodiments may be implemented.

FIG. 7 is a block diagram 700 illustrating an example of a machine, upon which one or more embodiments may be implemented. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The machine 700 may include an actuator control 730 used for control of electromechanical operations, e.g., of a 3-D machine actuator control, a sensor actuator control, or other electromechanical operations. Further, the machine 700 may include a destructor control 732 used for control of a layered destruction process. For example, the destructor control 732 may be used to control a source object layer removal device, an source object repositioning device, a suction device, an extruder device, or other devices used in destructive scanning.

The storage device 716 may include a machine-readable medium 722 on which is stored one or more sets of data structures or instructions 724 (e.g., software) embodying or used by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine-readable media.

Although the machine-readable medium 722 is illustrated as a single medium, the term "machine-readable medium" may include a single medium or multiple media (e.g., a centralized or distributed database, or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 using any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., networks operating according to the Institute of Electrical and Electronics Engineers (IEEE) 802.11 family of standards known as Wi-Fi®, networks operating according to the IEEE 802.16 family of standards known as WiMax®, and networks operating according to 3GPP Long Term Evolution (LTE) specifications), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700, and includes digital or analog communications signals or other intangible medium to facilitate communication of such software.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Example 1 is a method comprising: receiving a first image of a 3-D printed object, the first image associated with a first imaging device perspective; and identifying a 3-D printing defect based on a first comparison between the first image of the 3-D printed object and an image model.

In Example 2, the subject matter of Example 1 optionally includes wherein the first comparison includes applying a first image threshold to the first image.

In Example 3, the subject matter of any one or more of Examples 1-2 optionally include wherein the first image threshold is selected to reduce a probability of a false defect identification.

In Example 4, the subject matter of any one or more of Examples 1-3 optionally include receiving a second image of the 3-D printed object, the second image associated with a second imaging device perspective, the second imaging device perspective different from the first imaging device perspective; wherein identifying the 3-D printing defect is further based on a second comparison between the second image and the image model.

In Example 5, the subject matter of Example 4 optionally includes wherein the second comparison includes applying a second image threshold to the second image, the second image threshold different from the first image threshold.

In Example 6, the subject matter of any one or more of Examples 1-5 optionally include wherein comparing the first image includes excluding a background from the first image.

In Example 7, the subject matter of any one or more of Examples 1-6 optionally include wherein the image model is based on a 3-D printed object model.

In Example 8, the subject matter of any one or more of Examples 1-7 optionally include wherein the image model is based on an object specification corresponding to the 3-D printed object.

In Example 9, the subject matter of any one or more of Examples 1-8 optionally include wherein the image model is based on an imaging device perspective model.

In Example 10, the subject matter of any one or more of Examples 1-9 optionally include wherein the image model is based on a 3-D printing completion progress model.

In Example 11, the subject matter of any one or more of Examples 1-10 optionally include characterizing the 3-D printing defect as correctable by a 3-D printer; and generating correction instructions, the correction instructions causing a 3-D printer to correct the defect.

In Example 12, the subject matter of any one or more of Examples 1-11 optionally include characterizing the 3-D printing defect as requiring user intervention; and generating a user intervention notification, the user intervention notification including a 3-D printing defect identification.

In Example 13, the subject matter of any one or more of Examples 1-12 optionally include comparing the 3-D printing defect to a regulatory compliance assessment threshold; and generating a compliance notification, the compliance notification including a regulatory compliance assessment result.

Example 14 is a method comprising: capturing a first image of a source object to be 3-D printed, the first image associated with a first imaging device perspective; and generating a 3-D printing model based on the captured first image.

In Example 15, the subject matter of Example 14 optionally includes printing a 3-D printed replica of the source object, the printing based on the 3-D printing model of the source object.

In Example 16, the subject matter of any one or more of Examples 14-15 optionally include removing a portion of the source object to generate a destructively scanned object stage; and capturing a second image of the destructively scanned object stage.

In Example 17, the subject matter of Example 16 optionally includes wherein removing the portion of the source object includes removing a slice of the source object.

In Example 18, the subject matter of any one or more of Examples 16-17 optionally include wherein the second image of the destructively scanned object stage includes an interior portion of the source object.

In Example 19, the subject matter of Example 18 optionally includes identifying a material difference between a first material on an external portion and a second material on the interior portion; wherein generating the 3-D printing model is further based on the identified material difference.

In Example 20, the subject matter of any one or more of Examples 14-19 optionally include capturing a third image of the source object, the third image associated with a third imaging device perspective, the third imaging device perspective different from the first imaging device perspective; wherein generating the 3-D printing model is further based on the third image.

Example 21 is an apparatus comprising: a first image capture device to capture a first image of a 3-D printed object, the first image associated with a first imaging device perspective; and a processor configured to identify a 3-D printing defect based on a first comparison between the first image of the 3-D printed object and an image model.

In Example 22, the subject matter of Example 21 optionally includes wherein the first comparison includes applying a first image threshold to the first image.

In Example 23, the subject matter of any one or more of Examples 21-22 optionally include wherein the first image threshold is selected to reduce a probability of a false defect identification.

In Example 24, the subject matter of any one or more of Examples 21-23 optionally include a second image capture device to capture a second image of the 3-D printed object, the second image associated with a second imaging device perspective, the second imaging device perspective different from the first imaging device perspective; wherein the processor is further configured to identify the 3-D printing defect is further based on a second comparison between the second image and the image model.

In Example 25, the subject matter of Example 24 optionally includes wherein the second comparison includes applying a second image threshold to the second image, the second image threshold different from the first image threshold.

In Example 26, the subject matter of any one or more of Examples 21-25 optionally include wherein comparing the first image includes excluding a background from the first image.

In Example 27, the subject matter of any one or more of Examples 21-26 optionally include wherein the image model is based on a 3-D printed object model.

In Example 28, the subject matter of any one or more of Examples 21-27 optionally include wherein the image model is based on an object specification corresponding to the 3-D printed object.

In Example 29, the subject matter of any one or more of Examples 21-28 optionally include wherein the image model is based on an imaging device perspective model.

In Example 30, the subject matter of any one or more of Examples 21-29 optionally include wherein the image model is based on a 3-D printing completion progress model.

In Example 31, the subject matter of any one or more of Examples 21-30 optionally include wherein the processor is further configured to: characterize the 3-D printing defect as correctable by a 3-D printer; and generate correction instructions, the correction instructions causing a 3-D printer to correct the defect.

In Example 32, the subject matter of any one or more of Examples 21-31 optionally include wherein the processor is further configured to: characterize the 3-D printing defect as requiring user intervention; and generate a user intervention notification, the user intervention notification including a 3-D printing defect identification.

In Example 33, the subject matter of any one or more of Examples 21-32 optionally include wherein the processor is further configured to: compare the 3-D printing defect to a regulatory compliance assessment threshold; and generate a compliance notification, the compliance notification including a regulatory compliance assessment result.

Example 34 is a apparatus comprising: a first image capture device to capture a first image of a source object to be 3-D printed, the first image associated with a first imaging device perspective; and a processor configured to generate a 3-D printing model based on the captured first image.

In Example 35, the subject matter of Example 34 optionally includes a 3-D printer, the printer configured to print a 3-D printed replica of the source object, the printing based on the 3-D printing model of the source object.

In Example 36, the subject matter of any one or more of Examples 34-35 optionally include a destructive scanning device configured to remove a portion of the source object to generate a destructively scanned object stage; and a second image capture device to capture a second image of the destructively scanned object stage.

In Example 37, the subject matter of Example 36 optionally includes wherein removing the portion of the source object includes removing a slice of the source object.

In Example 38, the subject matter of any one or more of Examples 36-37 optionally include wherein the second image of the destructively scanned object stage includes an interior portion of the source object.

In Example 39, the subject matter of Example 38 optionally includes wherein the processor is further configured to identify a material difference between a first material on an external portion and a second material on the interior portion; wherein generating the 3-D printing model is further based on the identified material difference.

In Example 40, the subject matter of any one or more of Examples 34-39 optionally include a third image capture device to capture a third image of the source object, the third image associated with a third imaging device perspective, the third imaging device perspective different from the first imaging device perspective; wherein generating the 3-D printing model is further based on the third image.

Example 41 is at least one machine-readable storage medium, comprising a plurality of instructions that, responsive to being executed with processor circuitry of a computer-controlled device, cause the computer-controlled device to: receive a first image of a 3-D printed object, the first image associated with a first imaging device perspective; and identify a 3-D printing defect based on a first comparison between the first image of the 3-D printed object and an image model.

In Example 42, the subject matter of Example 41 optionally includes wherein the instructions cause the computer-controlled device to apply a first image threshold to the first image.

In Example 43, the subject matter of any one or more of Examples 41-42 optionally include wherein the first image threshold is selected to reduce a probability of a false defect identification.

In Example 44, the subject matter of any one or more of Examples 41-43 optionally include wherein the instructions cause the computer-controlled device to receive a second image of the 3-D printed object, the second image associated with a second imaging device perspective, the second imaging device perspective different from the first imaging device perspective; wherein identifying the 3-D printing defect is further based on a second comparison between the second image and the image model.

In Example 45, the subject matter of Example 44 optionally includes wherein the second comparison includes applying a second image threshold to the second image, the second image threshold different from the first image threshold.

In Example 46, the subject matter of any one or more of Examples 41-45 optionally include wherein comparing the first image includes excluding a background from the first image.

In Example 47, the subject matter of any one or more of Examples 41-46 optionally include wherein the image model is based on a 3-D printed object model.

In Example 48, the subject matter of any one or more of Examples 41-47 optionally include wherein the image model is based on an object specification corresponding to the 3-D printed object.

In Example 49, the subject matter of any one or more of Examples 41-48 optionally include wherein the image model is based on an imaging device perspective model.

In Example 50, the subject matter of any one or more of Examples 41-49 optionally include wherein the image model is based on a 3-D printing completion progress model.

In Example 51, the subject matter of any one or more of Examples 41-50 optionally include wherein the instructions cause the computer-controlled device to: characterize the 3-D printing defect as correctable by a 3-D printer; and generate correction instructions, the correction instructions causing a 3-D printer to correct the defect.

In Example 52, the subject matter of any one or more of Examples 41-51 optionally include wherein the instructions cause the computer-controlled device to: characterize the 3-D printing defect as requiring user intervention; and generate a user intervention notification, the user intervention notification including a 3-D printing defect identification.

In Example 53, the subject matter of any one or more of Examples 41-52 optionally include wherein the instructions cause the computer-controlled device to: compare the 3-D printing defect to a regulatory compliance assessment threshold; and generate a compliance notification, the compliance notification including a regulatory compliance assessment result.

Example 54 is at least one machine-readable storage medium, comprising a plurality of instructions that, responsive to being executed with processor circuitry of a computer-controlled device, cause the computer-controlled device to: capturing a first image of a source object to be 3-D printed, the first image associated with a first imaging device perspective; and generating a 3-D printing model based on the captured first image.

In Example 55, the subject matter of Example 54 optionally includes wherein the instructions cause the computer-controlled device to print a 3-D printed replica of the source object, the printing based on the 3-D printing model of the source object.

In Example 56, the subject matter of any one or more of Examples 54-55 optionally include wherein the instructions cause the computer-controlled device to remove a portion of the source object to generate a destructively scanned object stage; and capture a second image of the destructively scanned object stage.

In Example 57, the subject matter of Example 56 optionally includes wherein removing the portion of the source object includes removing a slice of the source object.

In Example 58, the subject matter of any one or more of Examples 56-57 optionally include wherein the second image of the destructively scanned object stage includes an interior portion of the source object.

In Example 59, the subject matter of Example 58 optionally includes wherein the instructions cause the computer-controlled device to identify a material difference between a first material on an external portion and a second material on the interior portion; wherein generating the 3-D printing model is further based on the identified material difference.

In Example 60, the subject matter of any one or more of Examples 54-59 optionally include wherein the instructions cause the computer-controlled device to capture a third image of the source object, the third image associated with a third imaging device perspective, the third imaging device perspective different from the first imaging device perspective; wherein generating the 3-D printing model is further based on the third image.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The following statements are potential claims that may be converted to claims in a future application. No modification of the following statements should be allowed to affect the interpretation of claims, which may be drafted when this provisional application is converted into a regular utility application.

What is claimed is:

1. A method comprising:
receiving a first optical image of a 3-D printed object, the first optical image associated with a first optical imaging device perspective; and
identifying a 3-D printing defect based on a first comparison between the first optical image of the 3-D printed object and an ideal object image, the ideal object image generated based on a 3-D object model and based on the first optical imaging device perspective, the first comparison including:
generating a difference image based on a pixel-by-pixel comparison between the first optical image and the ideal object image; and
generating a brightness image based on a pixel-by-pixel application of a brightness scaling factor to the difference image.

2. The method of claim 1, wherein the first comparison further includes generating a threshold image based on applying a pixel-by-pixel first image threshold to the brightness image.

3. The method of claim 2, wherein the first image threshold is selected to reduce a probability of a false defect identification.

4. The method of claim 2, further including receiving a second optical image of the 3-D printed object, the second optical image associated with a second imaging device perspective, the second imaging device perspective different from the first imaging device perspective;
wherein identifying the 3-D printing defect is further based on a second comparison between the second optical image and the ideal object image.

5. The method of claim 4, wherein the second comparison includes applying a second image threshold to the second optical image, the second image threshold different from the first image threshold.

6. The method of claim 1, wherein comparing the first optical image includes excluding a background from the first optical image.

7. The method of claim 1, further including:
characterizing the 3-D printing defect as correctable by a 3-D printer; and
generating correction instructions, the correction instructions causing a 3-D printer to correct the defect.

8. The method of claim 1, further including:
characterizing the 3-D printing defect as requiring user intervention; and
generating a user intervention notification, the user intervention notification including a 3-D printing defect identification.

9. The method of claim 1, further including:
comparing the 3-D printing defect to a regulatory compliance assessment threshold; and
generating a compliance notification, the compliance notification including a regulatory compliance assessment result.

10. An apparatus comprising:
a first optical image capture device to capture a first optical image of a 3-D printed object, the first optical image associated with a first imaging device perspective; and
a processor configured to identify a 3-D printing defect based on a first comparison between the first optical image of the 3-D printed object and an ideal object image, the ideal object image generated based on a 3-D object model and based on the first imaging device perspective, the first comparison including:
generating a difference image based on a pixel-by-pixel comparison between the first optical image and the ideal object image; and
generating a brightness image based on a pixel-by-pixel application of a brightness scaling factor to the difference image.

11. The apparatus of claim 10, wherein the first comparison further includes generating a threshold image based on applying a pixel-by-pixel first image threshold to the brightness image.

12. The apparatus of claim 11, wherein the first image threshold is selected to reduce a probability of a false defect identification.

13. The apparatus of claim 11, further including a second optical image capture device to capture a second optical image of the 3-D printed object, the second optical image associated with a second imaging device perspective, the second imaging device perspective different from the first imaging device perspective;
wherein the processor is further configured to identify the 3-D printing defect is further based on a second comparison between the second optical image and the ideal object image.

14. The apparatus of claim 10, wherein the processor is further configured to:
characterize the 3-D printing defect as correctable by a 3-D printer; and
generate correction instructions, the correction instructions causing a 3-D printer to correct the defect.

* * * * *